(12) United States Patent
Komatsuzaki et al.

(10) Patent No.: US 10,836,902 B2
(45) Date of Patent: Nov. 17, 2020

(54) METHOD FOR PRODUCING SEMI-IPN COMPOSITE

(71) Applicant: DIC Corporation, Tokyo (JP)

(72) Inventors: Kunihiko Komatsuzaki, Osaka (JP); Yayi Tseng, Osaka (JP)

(73) Assignee: DIC CORPORATION, Tokyo (JP)

( * ) Notice: Subject to any disclaimer, the term of this patent is extended or adjusted under 35 U.S.C. 154(b) by 98 days.

(21) Appl. No.: 16/337,293

(22) PCT Filed: Aug. 3, 2017

(86) PCT No.: PCT/JP2017/028200
§ 371 (c)(1),
(2) Date: Mar. 27, 2019

(87) PCT Pub. No.: WO2018/066218
PCT Pub. Date: Apr. 12, 2018

(65) Prior Publication Data
US 2019/0225801 A1 Jul. 25, 2019

(30) Foreign Application Priority Data
Oct. 3, 2016 (JP) ................................. 2016-195806

(51) Int. Cl.
| | | |
|---|---|---|
| *C08L 75/04* | (2006.01) | |
| *C08F 220/28* | (2006.01) | |
| *C08F 220/56* | (2006.01) | |
| *C08G 77/20* | (2006.01) | |
| *C08G 77/442* | (2006.01) | |
| *C08L 83/14* | (2006.01) | |
| *C08G 77/48* | (2006.01) | |

(52) U.S. Cl.
CPC ............ *C08L 75/04* (2013.01); *C08F 220/28* (2013.01); *C08F 220/56* (2013.01); *C08G 77/20* (2013.01); *C08G 77/442* (2013.01); *C08G 77/48* (2013.01); *C08L 83/14* (2013.01); *C08F 220/285* (2020.02); *C08G 2270/00* (2013.01); *C08L 2205/04* (2013.01); *C08L 2312/00* (2013.01)

(58) Field of Classification Search
CPC . C08L 2205/04; C08L 75/04–16; C08L 35/02
See application file for complete search history.

(56) References Cited

U.S. PATENT DOCUMENTS

| | | | |
|---|---|---|---|
| 5,804,611 A | 9/1998 | Takoh et al. | |
| 6,069,218 A * | 5/2000 | Vogt-Birnbrich | C08G 18/12 522/91 |
| 6,265,016 B1 * | 7/2001 | Hostettler | C08G 18/283 427/2.11 |
| 7,175,545 B2 * | 2/2007 | Kuntimaddi | A63B 37/0003 473/377 |
| 2003/0083389 A1 * | 5/2003 | Kao | A61L 15/225 516/98 |
| 2008/0221245 A1 | 9/2008 | Huang et al. | |
| 2008/0241214 A1 * | 10/2008 | Myung | A61L 27/06 424/423 |
| 2010/0234529 A1 * | 9/2010 | Shelekhov | C08G 18/8108 525/100 |
| 2015/0119497 A1 | 4/2015 | Matsui et al. | |

FOREIGN PATENT DOCUMENTS

| | | |
|---|---|---|
| JP | 05-25354 A | 2/1993 |
| JP | 07-197010 A | 8/1995 |
| JP | 08-165442 A | 6/1996 |
| JP | 09-87576 A | 3/1997 |
| JP | 2005-264152 A | 9/2005 |
| JP | 2008-169283 A | 7/2008 |
| JP | 2010-520364 A | 6/2010 |
| WO | 2013/146354 A1 | 10/2013 |

OTHER PUBLICATIONS

Du et al. Microwave-induced shape-memory poly(vinyl alcohol)/poly(acrylic acid) interpenetrating polymer networks chemically linked to SiC nanoparticles. Iranian Polymer Journal (2018) 27:621-628. (Year: 2018).*
International Search Report issued in corresponding International Patent Application No. PCT/JP2017/028200, dated Nov. 7, 2017, with English Translation.

\* cited by examiner

*Primary Examiner* — Michael M Dollinger
(74) *Attorney, Agent, or Firm* — McDermott Will & Emery LLP

(57) ABSTRACT

The present invention is directed to a method for producing a semi-IPN composite, including: mixing a polyurethane (A) and a polymerization product (B) of a hydrophilic acrylic monomer (b1) and an acrylic monomer (b2) having a hydrolyzable silyl group; and causing the polymerization product (B) to undergo crosslinking. The hydrophilic acrylic monomer (b1) preferably includes an acrylic monomer (b1-1) having an amide group and an acrylic monomer (b1-2) having an oxyethylene group. Further, the polymerization ratio (molar ratio) of the acrylic monomer (b1-1) having an amide group, the acrylic monomer (b1-2) having an oxyethylene group, and the acrylic monomer (b2) having a hydrolyzable silyl group {(b1-1)/(b1-2)/(b2)} is preferably in the range of 50/49.5/0.5 to 89/1/10.

4 Claims, No Drawings

METHOD FOR PRODUCING SEMI-IPN COMPOSITE

CROSS REFERENCE

This patent application is the U.S. National Phase under 35 U.S.C. § 371 of International Application No. PCT/JP2017/028200, filed on Aug. 3, 2017, which claims the benefit of Japanese Patent Application No. 2016-195806, filed on Oct. 3, 2016, the entire contents of each are hereby incorporated by reference.

TECHNICAL FIELD

The present invention relates to a method for producing a semi-IPN composite, by which a semi-IPN composite having excellent resistance to swelling by water can be obtained.

BACKGROUND ART

Polyurethane has excellent mechanical strength and elastic properties, and therefore has been widely used in various fields of coating agent, molding material, coating composition, optical film, and the like, and studies on the use of polyurethane as a material for moisture-permeable, waterproof cloth and synthetic leather are being extensively made.

When the polyurethane is used in producing a synthetic leather and the like, a nonwoven fabric substrate is impregnated with a composition comprising polyurethane as a main component and subjected to surface treatment, or woven or knitted fabric as base fabric is coated with the above composition, producing a synthetic leather and the like. Such synthetic leather and the like have excellent hand and external appearance and the like, and hence have been widely used in shoes, clothes, furniture, gloves, automobile seats and the like.

However, when conventional polyurethane is used in, for example, shoes and clothes, a problem is caused in that the moisture permeability is unsatisfactory such that those who use them feel moist, or an unpleasant smell is generated. Further, when the polyurethane is used in furniture and automobile seats, in addition to the problem of causing users to feel moist, there is a disadvantage in that the stain resistance, particularly, resistance to a stain due to a sebum component is poor so that it is difficult to remove a stain caused by the use for a long term. The root of these problems resides in inherent hydrophobicity of polyurethane which is a raw material for the synthetic leather. Therefore, in order to solve these problems, an improvement of the hydrophilicity of polyurethane is significant, and further it is important that polyurethane does not swell even when being in contact with water for achieving actual use in various applications.

As a method of improving the hydrophilicity of polyurethane, for example, a method using polyurethane comprised mainly of polyoxyethylene glycol has been proposed (see, for example, PTL 1). However, polyoxyethylene glycol which is a raw material for polyurethane has high water absorption properties, and thus causes a problem in that the polyurethane swells due to a contact with water when actually used, causing a change in the external appearance or removal from a substrate. Further, there is another problem in that the ether group concentration of the system is so high that only poor light resistance, heat resistance and the like can be obtained, making it difficult to develop the use of polyurethane in furniture and car applications which need durability.

CITATION LIST

Patent Literature

PTL 1: JP-A-2005-264152

SUMMARY OF INVENTION

Technical Problem

A task to be achieved by the present invention is to provide a method for producing a semi-IPN composite having excellent resistance to swelling by water.

Solution to Problem

The present invention is directed to a method for producing a semi-IPN composite, including: mixing a polyurethane (A) and a polymerization product (B) of a hydrophilic acrylic monomer (b1) and an acrylic monomer (b2) having a hydrolyzable silyl group; and causing the polymerization product (B) to undergo crosslinking.

Advantageous Effects of Invention

The semi-INP composite obtained by the method of the invention has excellent resistance to swelling by water. Therefore, the semi-IPN composite can be advantageously used as a moisture-permeable, waterproof cloth for clothing, medical, and sanitary uses and the like; and a skin layer or a topcoat layer of synthetic leather.

DESCRIPTION OF EMBODIMENTS

The method of the invention for producing a semi-IPN composite includes, as essential steps, mixing a polyurethane (A) and a polymerization product (B) of a hydrophilic acrylic monomer (b1) and an acrylic monomer (b2) having a hydrolyzable silyl group and causing the polymerization product (B) to undergo crosslinking.

The semi-IPN (Interpenetrating polymer Network) composite is a composite having a network structure such that a crosslinked hetero-polymer has interpenetrated a non-crosslinking polymer. In the invention, the polymerization product (B) mixed into the non-crosslinking polyurethane (A) causes a hydrolyzable silyl group-derived crosslinking reaction in the polyurethane (A), forming a composite in which the polyurethane (A) and the polymerization product (B) are entangled with each other.

According to this crosslinking method, a semi-IPN composite having excellent resistance to swelling by water can be very stably produced by hydrolyzable silyl group-derived crosslinking without being affected by enzyme inhibition.

As the polyurethane (A), for example, a reaction product of a polyol (a1) and a polyisocyanate (a2) can be used. In the invention, the formation of a semi-IPN structure due to the polymerization product (B) makes it possible to exhibit excellent resistance to swelling by water, and therefore other physical properties, such as durability, as well as the type of the polyol (a1) can be freely designed.

As the polyol (a1), for example, polyether polyol, polycarbonate polyol, polyester polyol, polyacryl polyol, polybutadiene polyol, hydrogenated polybutadiene polyol, or the like can be used. These polyols may be used individually or in combination.

The number average molecular weight of the polyol (a1) can be in the range of 500 to 10,000 and can be appropriately determined according to the intended physical properties. The number average molecular weight of the polyol (a1) indicates a value obtained by conducting the measurement by a gel permeation chromatography (GPC) method under the conditions shown below.

Measuring apparatus: High-speed GPC apparatus ("HLC-8220GPC", manufactured by Tosoh Corp.)

Columns: The columns shown below, manufactured by Tosoh Corp., which are connected in series were used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (differential refractometer)
Column temperature: 40° C.
Eluent: Tetrahydrofuran (THF)
Flow rate: 1.0 mL/minute
Sample amount per injection: 100 µL (tetrahydrofuran solution having a sample concentration of 0.4% by mass)
Standard sample: A calibration curve was prepared using the standard polystyrenes shown below.
(Standard Polystyrenes)
"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.
"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.
"TSKgel standard polystyrene F-128", manufactured by Tosoh Corp.
"TSKgel standard polystyrene F-288", manufactured by Tosoh Corp.
"TSKgel standard polystyrene F-550", manufactured by Tosoh Corp.

If necessary, a chain extender (a1-1) having a number average molecular weight in the range of 50 to 450 may be used in combination with the polyol (a1). In this regard, the number average molecular weight of the chain extender (a1-1) indicates a value obtained by conducting the same measurement as the measurement made for the number average molecular weight of the polyol (a1).

As the chain extender (a1-1), for example, a chain extender having a hydroxyl group, such as ethylene glycol, diethylene glycol, triethylene glycol, propylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, 4,4'-dihydroxydiphenyl sulfone, hydrogenated bisphenol A, or hydroquinone; a chain extender having an amino group, such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, or triethylenetetramine, or the like can be used. These chain extenders may be used individually or in combination.

When the chain extender (a1-1) is used, from the viewpoint of the mechanical strength and hand, the amount of the chain extender used is preferably in the range of 0.1 to 30 parts by mass, relative to 100 parts by mass of the polyol (a1).

As the polyisocyanate (a2), for example, an aromatic polyisocyanate (a2-1), such as 1,3-phenylene diisocyanate, 1,4-phenylene diisocyanate, 1-methyl-2,4-phenylene diisocyanate, 1-methyl-2,6-phenylene diisocyanate, 1-methyl-2,5-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, diethylbenzene diisocyanate, diisopropylbenzene diisocyanate, 1-methyl-3,5-diethylbenzene diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate, 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3-3'-dimethylbiphenyl-4,4'-diisocyanate, 4,4'-diphenylmethane diisocyanate, 2,2'-diphenylmethane diisocyanate, or diphenylmethane-2,4-diisocyanate; an aliphatic or alicyclic polyisocyanate (a2-2), such as tetramethylene diisocyanate, 1,6-hexamethylene diisocyanate, dodecamethylene diisocyanate, trimethylhexamethylene diisocyanate, 1,3-cyclopentylene diisocyanate, 1,3-cyclohexylene diisocyanate, 1,4-cyclohexylene diisocyanate, 1,3-di(isocyanate methyl)cyclohexane, 1,4-di(isocyanate methyl) cyclohexane, lysine diisocyanate, isophorone diisocyanate, 4,4'-dicyclohexylmethane diisocyanate, 2,4'-dicyclohexylmethane diisocyanate, 2,2'-dicyclohexylmethane diisocyanate, or 3,3'-dimethyl-4,4'-dicyclohexylmethane diisocyanate, or the like can be used. These polyisocyanates may be used individually or in combination.

When the aromatic polyisocyanate (a2-1) is used as the polyisocyanate (a2), not only a resistance to swelling by water, which is the effect of the invention, but also excellent moisture permeability can be obtained. The reason for this is presumed that the hydrophilic acrylic component is not locally present in the surface but is readily distributed evenly through the film. When the aromatic polyisocyanate (a2-1) is used as the polyisocyanate (a2), from the viewpoint of obtaining further excellent moisture permeability, the content of the aromatic polyisocyanate (a2-1) in the polyisocyanate (a2) is preferably 60% by mass or more, more preferably 80% by mass or more. Further, when the aromatic polyisocyanate (a2-1) is used as the polyisocyanate (a2), not only a resistance to swelling by water, which is the effect of the invention, but also excellent moisture permeability can be obtained, and therefore the resultant semi-IPN composite can be especially preferably used as a moisture-permeable film.

Further, when the aliphatic or alicyclic polyisocyanate (a2-2) is used as the polyisocyanate (a2), not only a resistance to swelling by water, which is the effect of the invention, but also excellent hydrophilicity and further excellent resistance to an oil stain, such as sebum, due to the hydrophilicity can be obtained. The reason for this is presumed that the hydrophilic polymerization product (B) which imparts a stain resistance is readily locally present in the surface of the film. When the aliphatic or alicyclic polyisocyanate (a2-2) is used as the polyisocyanate (a2), from the viewpoint of obtaining further excellent moisture permeability, the content of the aliphatic or alicyclic polyisocyanate (a2-2) in the polyisocyanate (a2) is preferably 60% by mass or more, more preferably 80% by mass or more. Further, when the aliphatic or alicyclic polyisocyanate (a2-2) is used as the polyisocyanate (a2), not only a resistance to swelling by water, which is the effect of the invention, but also excellent hydrophilicity and further excellent stain resistance can be obtained, and therefore the resultant semi-IPN composite can be especially preferably used as a skin layer or a topcoat layer of a synthetic leather for car.

As a method for producing the polyurethane (A), for example, there can be mentioned a method in which the polyol (a1), the polyisocyanate (a2), an organic solvent, and, if necessary, the above-mentioned chain extender (a1-1) are charged and subjected to urethane-forming reaction to produce a polyurethane (A) solution. The above reaction is conducted, for example, at a temperature of 50 to 100° C. for 3 to 10 hours.

As the organic solvent, for example, N,N-dimethylformamide, N,N-dimethylacetamide, N-methyl-2-pyrrolidone, methyl ethyl ketone, methyl-n-propyl ketone, acetone, methyl isobutyl ketone, methyl formate, ethyl formate, propyl formate, methyl acetate, ethyl acetate, isopropyl acetate, isobutyl acetate, isobutyl acetate, sec-butyl acetate, methanol, ethanol, isopropyl alcohol, butanol, or the like can be used. These organic solvents may be used individually or in combination. The amount of the organic solvent used is preferably in the range of 10 to 1,000 parts by mass, more preferably in the range of 20 to 600 parts by mass, relative to 100 parts by mass of the polyurethane (A).

From the viewpoint of the production stability and mechanical strength, the molar ratio of the isocyanate group of the polyisocyanate (a2) to the total of the hydroxyl group and the amino group of the polyol (a1) and the chain extender (a1-1) [isocyanate group/hydroxyl group and amino group] is preferably in the range of 0.8 to 1.2, more preferably in the range of 0.9 to 1.1.

The weight average molecular weight of the polyurethane (A) can be in the range of 500 to 500,000 and can be appropriately determined according to the intended physical properties. In this regard, the weight average molecular weight of the polyurethane (A) indicates a value obtained by conducting the same measurement as the measurement made for the number average molecular weight of the polyol (a1).

Next, the polymerization product (B) of the hydrophilic acrylic monomer (b1) and the acrylic monomer (b2) having a hydrolyzable silyl group is described. In the invention, for obtaining excellent resistance to swelling by water, it is essential to use the polymerization product (B). The hydrophilic acrylic monomer (b1) enables the film to exhibit hydrophilicity and a resistance to swelling by water, and further the acrylic monomer (b2) having a hydrolyzable silyl group enables stable formation of a semi-IPN structure, and therefore the resistance to swelling by water can be further improved. Furthermore, the formation of a semi-IPN structure can prevent the hydrophilic component from being removed from the film when the film is continuously actually used, obtaining excellent durability for strength of the film.

The "hydrophilicity" of the hydrophilic acrylic monomer (b1) indicates an affinity with water, and specifically indicates an acrylic monomer having a solubility in 100 g of water (at 20° C.) of preferably 5% by mass or more, more preferably 10% by mass or more, further preferably 20% by mass or more. Further, the "monomer" for (b1) indicates having one (meth)acryloyl group.

As the hydrophilic acrylic monomer (b1), for example, an acrylic monomer (b1-1) having an amide group, an acrylic monomer (b1-2) having an oxyethylene group, an acrylic monomer having a sulfonic group, an acrylic monomer having a quaternary ammonium group, an acrylic monomer having a carboxyl group, an acrylic monomer having an amino group, an acrylic monomer having a cyano group, an acrylic monomer having a hydroxyl group, an acrylic monomer having an imide group, an acrylic monomer having a methoxy group, or the like can be used.

As the acrylic monomer (b1-1) having an amide group, for example, (meth)acrylamide, (meth)acryloylmorpholine, N-methylol(meth)acrylamide, N-methoxyethyl(meth)acrylamide, N,N-dimethylacrylamide, N,N-diethylacrylamide, N-isopropylacrylamide, or the like can be used. These monomers may be used individually or in combination.

As the acrylic monomer (b1-2) having an oxyethylene group, for example, polyethylene glycol (meth)acrylate, methoxypolyethylene glycol (meth)acrylate, or the like can be used. These monomers may be used individually or in combination.

As the acrylic monomer having a sulfonic group, for example, sodium sulfopropyl(meth)acrylate, sodium 2-sulfoethyl(meth)acrylate, sodium 2-acrylamide-2-methylpropanesulfonate, or the like can be used. These monomers may be used individually or in combination.

As the acrylic monomer having a quaternary ammonium group, for example, tetrabutylammonium (meth)acrylate, trimethylbenzylammonium (meth)acrylate, or the like can be used. These monomers may be used individually or in combination.

As the acrylic monomer having a carboxyl group, for example, (meth)acrylic acid, propyl (meth)acrylate, isopropyl (meth)acrylate, crotonic acid, fumaric acid, or the like can be used. These monomers may be used individually or in combination.

As the acrylic monomer having an amino group, for example, dimethylaminoethyl (meth)acrylate, diethylaminoethyl (meth)acrylate, N-tert-butylaminoethyl (meth)acrylate, methacryloxyethyltrimethylammonium chloride (meth)acrylate, or the like can be used. These monomers may be used individually or in combination.

As the acrylic monomer having a cyano group, for example, acrylonitrile, cyanomethyl acrylate, 2-cyanoethyl acrylate, cyanopropyl acrylate, 1-cyanomethylethyl acrylate, 2-cyanopropyl acrylate, 1-cyanocyclopropyl acrylate, 1-cyanocycloheptyl acrylate, 1,1-dicyanoethyl acrylate, 2-cyanophenyl acrylate, 3-cyanophenyl acrylate, 4-cyanophenyl acrylate, 3-cyanobenzyl acrylate, 4-cyanobenzyl acrylate, or the like can be used. These monomers may be used individually or in combination.

As the acrylic monomer having a hydroxyl group, for example, 2-hydroxyethyl (meth)acrylate, 2-hydroxypropyl (meth)acrylate, 2-hydroxybutyl (meth)acrylate, 4-hydroxybutyl (meth)acrylate, glycerol mono(meth)acrylate, or the like can be used. These monomers may be used individually or in combination.

As the acrylic monomer having an imide group, for example, (meth)acrylimide, N-methylolmaleimide, N-hydroxyethylmaleimide, N-glycidylmaleimide, N-4-chloromethylphenylmaleimide, N-acetoxyethylmaleimide, or the like can be used. These monomers may be used individually or in combination.

As the acrylic monomer having a methoxy group, for example, 3-methoxybutyl (meth)acrylate), 2-methoxyethyl (meth)acrylate, 3-methoxypropyl (meth)acrylate, 2-methoxybutyl (meth)acrylate, or the like can be used. These monomers may be used individually or in combination.

As the hydrophilic acrylic monomer (b1), among those mentioned above, the acrylic monomer (b1-1) having an amide group and the acrylic monomer (b1-2) having an oxyethylene group are preferably used because they have an amide group having a nitrogen atom substituted with highly hydrophilic alkyl and polyoxyethylene glycol in the side chain thereof, and therefore excellent hydrophilicity and resistance to swelling by water can be obtained. The amount of the total of the acrylic monomer (b1-1) having an amide group and the acrylic monomer (b1-2) having an oxyethylene group in the hydrophilic acrylic monomer (b1) is preferably 70% by mass or more, more preferably 80% by mass or more, further preferably 90% by mass or more.

Further, with respect to the acrylic monomer (b1-2) having an oxyethylene group, from the viewpoint of maintaining the durability for strength and moisture permeability of the film for a long term, the average addition molar number of oxyethylene group is preferably in the range of 5 to 13 mol, more preferably in the range of 8 to 10 mol.

As the acrylic monomer (b2) having a hydrolyzable silyl group, for example, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-methacryloxypropyltributoxysilane, 3-acryloxypropyltrimethoxysilane, 3-acryloxypropyltriethoxysilane, 3-acryloxypropylmethyldimethoxysilane, 3-acryloxymethyltrimethoxysilane, or the like can be used. These acrylic monomers may be used individually or in combination. Of these, an acrylic monomer having two alkoxysilane groups is preferably used because a semi-IPN composite can be extremely stably produced.

From the viewpoint of obtaining further excellent resistance to swelling by water, the polymerization ratio (molar ratio) of the hydrophilic acrylic monomer (b1) and the acrylic monomer (b2) having a hydrolyzable silyl group is preferably in the range of 99.5/0.5 to 90/10, more preferably in the range of 99/1 to 95/5.

Further, from the viewpoint of obtaining further excellent resistance to swelling by water, the polymerization ratio (molar ratio) of the acrylic monomer (b1-1) having an amide group, the acrylic monomer (b1-2) having an oxyethylene group, and the acrylic monomer (b2) having a hydrolyzable silyl group {(b1-1)/(b1-2)/(b2)} is preferably in the range of 50/49.5/0.5 to 89/1/10, more preferably in the range of 70/29/1 to 88/7/5.

If necessary, another radically polymerizable monomer may be used in combination with the hydrophilic acrylic monomer (b1) and the acrylic monomer (b2) having a hydrolyzable silyl group.

As the another radically polymerizable monomer, for example, an aliphatic (meth)acrylate, such as methyl (meth)acrylate, ethyl (meth)acrylate, propyl (meth)acrylate, isopropyl (meth)acrylate, butyl (meth)acrylate, sec-butyl (meth)acrylate, isobutyl (meth)acrylate, 2-ethylbutyl (meth)acrylate, n-pentyl (meth)acrylate, hexyl (meth)acrylate, 2-ethylhexyl (meth)acrylate, heptyl (meth)acrylate, n-octyl (meth)acrylate, nonyl (meth)acrylate, dodecyl (meth)acrylate, 3-methylbutyl (meth)acrylate, isooctyl (meth)acrylate, lauryl (meth)acrylate, tridecyl (meth)acrylate, stearyl (meth)acrylate, isostearyl (meth)acrylate, neopentyl (meth)acrylate, hexadecyl (meth)acrylate, or isoamyl (meth)acrylate; an alicyclic (meth)acrylate, such as isobornyl (meth)acrylate, cyclohexyl (meth)acrylate, or tetrahydrofurfuryl (meth)acrylate; an aromatic (meth)acrylate, such as benzyl (meth)acrylate, phenoxyethyl (meth)acrylate, or phenyl (meth)acrylate; a vinyl compound, such as styrene, α-methylstyrene, chlorostyrene, chloromethylstyrene, methyl vinyl ether, ethyl vinyl ether, or isobutyl vinyl ether, or the like can be used. These monomers may be used individually or in combination.

As a polymerization method for the hydrophilic acrylic monomer (b1) and the acrylic monomer (b2) having a hydrolyzable silyl group, a known radical polymerization can be used, and, for example, there can be mentioned a method in which to the above-mentioned polyurethane (A) solution are added the hydrophilic acrylic monomer (b1), the acrylic monomer (b2) having a hydrolyzable silyl group, the polymerization initiator, and, if necessary, the another radically polymerizable monomer and an organic solvent, and the resultant mixture is stirred or allowed to stand at a temperature, for example, in the range of 40 to 90° C. for, for example, 1 to 20 hours to advance radical polymerization.

As the polymerization initiator, for example, a peroxide, such as hydrogen peroxide, potassium persulfate, sodium persulfate, or ammonium persulfate; an organic peroxide, such as benzoyl peroxide, t-butylperoxy-2-ethyl hexanoate, or cumene hydroperoxide; an azo compound, such as 2,2'-azobis-(2-aminodipropane) dihydrochloride, 2,2'-azobis-(N,N'-dimethyleneisobutylamidine) dihydrochloride, azobisisobutyronitrile, 2,2'-azobis(2-methylbutyronitrile), or 2,2'-azobis(2,4-dimethylvaleronitrile), or the like can be used. These polymerization initiators may be used individually or in combination. The amount of the polymerization initiator used is, for example, in the range of 0.001 to 5 parts by mass, relative to 100 parts by mass of the total of the hydrophilic acrylic monomer (b1) and the acrylic monomer (b2) having a hydrolyzable silyl group.

From the viewpoint of obtaining further excellent resistance to swelling by water, the amount of the polymerization product (B) mixed is preferably in the range of 10 to 70 parts by mass, more preferably in the range of 20 to 40 parts by mass, relative to 100 parts by mass of the polyurethane (A).

Next, the method for producing a semi-IPN composite of the present invention is described.

The method for producing a semi-IPN composite of the invention is a method in which the polyurethane (A) and the polymerization product (B) are mixed with each other, and then hydrolysis of the hydrolyzable silyl group of the polymerization product (B) and a condensation reaction are conducted to cause the polymerization product (B) to undergo crosslinking, producing a semi-IPN composite.

For accelerating the hydrolysis of the hydrolyzable silyl group and condensation reaction, it is preferred to use a catalyst.

As the catalyst, for example, there can be mentioned inorganic acids, such as hydrochloric acid, sulfuric acid, and phosphoric acid; organic acids, such as p-toluenesulfonic acid, monoisopropyl phosphate, and acetic acid; inorganic bases, such as sodium hydroxide and potassium hydroxide; titanates, such as tetraisopropyl titanate and tetrabutyl titanate; compounds containing a basic nitrogen atom, such as 1,8-diazabicyclo[5.4.0]undecene-7 (DBU), 1,5-diazabicyclo [4.3.0]nonene-5 (DBN), 1,4-diazabicyclo[2.2.2]octane (DABCO), tri-n-butylamine, dimethylbenzylamine, monoethanolamine, imidazole, and 1-methylimidazole; various quaternary ammonium salts, such as a tetramethylammonium salt, a tetrabutylammonium salt, and a dilauryldimethylammonium salt, wherein the quaternary ammonium salts have a chloride, a bromide, a carboxylate, a hydroxide, or the like as a counter anion; and tin carboxylates, such as dibutyltin diacetate, dibutyltin dioctoate, dibutyltin dilaurate, dibutyltin diacetylacetonate, tin octylate, and tin stearate. These catalysts may be used individually or in combination.

When the catalyst is used, the amount of the catalyst used is preferably in the range of 0.0001 to 10 parts by mass, more preferably in the range of 0.0005 to 3 parts by mass, relative to 100 parts by mass of the polymerization product (B).

The hydrolysis of the hydrolyzable silyl group and condensation reaction are preferably conducted under conditions, for example, at a temperature in the range of 0 to 150° C., preferably at a temperature in the range of 20 to 80° C., for a time in the range of 30 minutes to 20 hours, preferably 1 to 10 hours.

If necessary, another additive may be added to the semi-IPN composite obtained by the above-mentioned method.

As the another additive, for example, a pigment, a flame retardant, a plasticizer, a softening agent, a stabilizer, a wax, an anti-foaming agent, a dispersant, a penetrant, a surfactant, a filler, a mildewproofing agent, an anti-fungus agent, an ultraviolet light absorber, an antioxidant, a weathering stabilizer, a fluorescent brightener, an antioxidant, a thickener, or the like can be used. These additives may be used individually or in combination.

Next, a method for producing a moisture-permeable film from the semi-IPN composite is described.

A method for producing the moisture-permeable film may include, for example, applying the semi-IPN composite to a substrate and drying it at a temperature, for example, in the range of 40 to 150° C. for, for example, 1 to 30 minutes.

As a substrate to which the semi-IPN composite is applied, for example, glass; release paper; a plastic film; a substrate formed from nonwoven fabric, woven fabric, or knitted fabric; a resin film; paper, or the like can be used. As a material constituting the substrate, for example, a chemical fiber, such as a polyester fiber, a nylon fiber, an acrylic fiber, a polyurethane fiber, an acetate fiber, a rayon fiber, or a polylactate fiber; cotton, linen, silk, wool, a mixed fiber thereof, or the like can be used. When a substrate formed from nonwoven fabric, woven fabric, or knitted fabric is used as the substrate, a state in which the inside of the substrate is impregnated with a dried material of the semi-IPN composite is formed, and such a mode is also called a film in the present invention.

The surface of the substrate, if necessary, may be subjected to treatment, such as antistatic processing, release treatment processing, water repellency processing, water absorption processing, antifungal and deodorization processing, bacteriostatic processing, or ultraviolet light screen processing.

As a method for applying the semi-IPN composite to the surface of the substrate, for example, there can be mentioned a gravure coater method, a knife coater method, a pipe coater method, and a comma coater method.

The thickness of the moisture-permeable film can be determined according to the application in which the moisture-permeable film is used, and is, for example, in the range of 0.01 to 10 mm.

When the moisture-permeable film is used in producing a moisture-permeable, waterproof cloth, as a method for producing a moisture-permeable, waterproof cloth, for example, there can be mentioned a method in which the moisture-permeable film is bonded to a cloth using a known bonding agent; and a method in which the semi-IPN composite is directly applied onto a cloth and dried. As the cloth, for example, one which is obtained from a chemical fiber, such as a polyester fiber, a nylon fiber, an acrylic fiber, a polyurethane fiber, an acetate fiber, a rayon fiber, or a polylactate fiber; cotton, linen, silk, wool, a mixed fiber thereof, or the like can be used.

Further, when the moisture-permeable film is used in producing a synthetic leather, as a method for producing a synthetic leather, for example, there can be mentioned a method in which the semi-IPN composite is applied onto release paper and dried and then, the resultant moisture-permeable film is bonded onto an intermediate layer or a skin layer using a known bonding agent. As the base fabric, for example, one which is obtained from a chemical fiber, such as a polyester fiber, a nylon fiber, an acrylic fiber, a polyurethane fiber, an acetate fiber, a rayon fiber, or a polylactate fiber; cotton, linen, silk, wool, a mixed fiber thereof, or the like can be used.

Next, a method for producing a skin layer or a topcoat layer of synthetic leather from the semi-IPN composite is described.

As a method for producing the skin layer of synthetic leather, for example, there can be mentioned a method in which the semi-IPN composite is applied onto release paper or a topcoat layer formed on release paper, and dried at a temperature, for example, in the range of 40 to 150° C. for, for example, 1 to 30 minutes, and then the resultant dried material is bonded onto an intermediate layer of a synthetic leather using a known bonding agent.

Further, as a method for producing the topcoat layer of synthetic leather, for example, there can be mentioned a method in which the semi-IPN composite is applied onto release paper or release paper, and dried at a temperature, for example, in the range of 40 to 150° C. for, for example, 1 to 30 minutes, and then the resultant dried material is bonded onto a skin layer of a synthetic leather using a known bonding agent.

As a method for applying the semi-IPN composite, for example, there can be mentioned a gravure coater method, a knife coater method, a pipe coater method, and a comma coater method.

The thickness of the dried material layer of the semi-IPN composite can be determined according to the application in which the resultant layer is used, and is, for example, in the range of 0.01 to 10 mm.

EXAMPLES

Hereinbelow, the present invention will be described in more detail with reference to the following Examples.

[Synthesis Example 1] <Synthesis of Polymerization Product (B-1)>

Into a reaction apparatus equipped with a stirrer, a thermometer, and a nitrogen gas introducing pipe was charged 2-propanol, and then a mixture of N,N-dimethylacrylamide/ methoxypolyethylene glycol acrylate ("AM-90G", manufactured by Shin-Nakamura Chemical Co., Ltd.; average addition molar number of oxyethylene group: 9 mol)/3-methacryloxypropylmethyldiethoxysilane (molar ratio=71/24/5) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-1). The obtained polymerization product (B-1) had a weight average molecular weight of 20,000 and a solids content of 50% by mass.

[Synthesis Example 2] <Synthesis of Polymerization Product (B-2)>

Into a reaction apparatus equipped with a stirrer, a thermometer, and a nitrogen gas introducing pipe was charged 2-propanol, and then a mixture of N,N-dimethylacrylamide/methoxypolyethylene glycol acrylate (AM-90G)/3-methacryloxypropylmethyldiethoxysilane (molar ratio=68/22/10) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-2). The obtained polymerization product (B-2) had a weight average molecular weight of 20,000 and a solids content of 50% by mass.

[Synthesis Example 3] <Synthesis of Polymerization Product (B-3)>

Into a reaction apparatus equipped with a stirrer, a thermometer, and a nitrogen gas introducing pipe was charged 2-propanol, and then a mixture of N,N-dimethylacrylamide/methoxypolyethylene glycol acrylate (AM-90G)/3-methacryloxypropyltriethoxysilane (molar ratio=71/24/5) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-3). The obtained polymerization product (B-3) had a weight average molecular weight of 20,000 and a solids content of 50% by mass.

[Synthesis Example 4] <Synthesis of Polymerization Product (B-4)>

Into a reaction apparatus equipped with a stirrer, a thermometer, and a nitrogen gas introducing pipe was charged 2-propanol, and then a mixture of N,N-dimethylacrylamide/methoxypolyethylene glycol acrylate (AM-90G)/3-methacryloxypropyltriethoxysilane (molar ratio=68/22/10) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-4). The obtained polymerization product (B-4) had a weight average molecular weight of 20,000 and a solids content of 50% by mass.

[Synthesis Example 5] <Synthesis of Polymerization Product (B-5)>

Into a reaction apparatus equipped with a stirrer, a thermometer, and a nitrogen gas introducing pipe was charged 2-propanol, and then a mixture of N,N-dimethylacrylamide/methoxypolyethylene glycol acrylate (AM-90G)/3-methacryloxypropyltrimethoxysilane (molar ratio=71/24/5) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-5). The obtained polymerization product (B-5) had a weight average molecular weight of 20,000 and a solids content of 50% by mass.

[Synthesis Example 6] <Synthesis of Polymerization Product (B-6)>

Into a reaction apparatus equipped with a stirrer, a thermometer, and a nitrogen gas introducing pipe was charged 2-propanol, and then a mixture of N,N-dimethylacrylamide/methoxypolyethylene glycol acrylate (AM-90G)/3-methacryloxypropyltrimethoxysilane (molar ratio=68/22/10) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-6). The obtained polymerization product (B-6) had a weight average molecular weight of 20,000 and a solids content of 50% by mass.

[Synthesis Example 7] <Synthesis of Polymerization Product (B-7)>

Into a reaction apparatus equipped with a stirrer, a thermometer, and a nitrogen gas introducing pipe was charged 2-propanol, and then a mixture of N,N-dimethylacrylamide/methoxypolyethylene glycol acrylate ("AM-130G", manufactured by Shin-Nakamura Chemical Co., Ltd.; average addition molar number of oxyethylene group: 13 mol)/3-methacryloxypropylmethyldiethoxysilane (molar ratio=71/24/5) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-7). The obtained polymerization product (B-7) had a weight average molecular weight of 20,000 and a solids content of 50% by mass.

[Synthesis Example 8] <Synthesis of Polymerization Product (B-8)>

Into a reaction apparatus equipped with a stirrer, a thermometer, and a nitrogen gas introducing pipe was charged 2-propanol, and then a mixture of N,N-dimethylacrylamide/methoxypolyethylene glycol acrylate (AM-130G)/3-methacryloxypropylmethyldiethoxysilane (molar ratio=68/22/10) and an azo polymerization initiator "V-601", manufactured by Wako Pure Chemical Industries, Ltd., in an amount of 2% by mass were added, and the resultant mixture was subjected to reaction in the reaction apparatus at 80° C. for 6 hours to obtain a polymerization product (B-8). The obtained polymerization product (B-8) had a weight average molecular weight of 20,000 and a solids content of 50% by mass.

Example 1

To 100 parts by mass of an N,N-dimethylformamide solution of polyester urethane using diphenylmethane diisocyanate as a raw material (solids content: 20% by mass; hereinafter, abbreviated to "MDI/PEs Pu") were added 30 parts by mass of the polymerization product (B-1) and 0.5 part by mass of phosphoric acid as an acid catalyst, and the resultant mixture was subjected to reaction for 5 hours to obtain a semi-IPN composite.

Examples 2 to 10

Semi-IPN composites were individually obtained in substantially the same manner as in Example 1 except that the types and/or amounts of the polyurethane (A) and polymerization product (B) used were changed as shown in Tables 1 and 2.

Comparative Example 1

Using an N,N-dimethylformamide solution of hydrophilic polyether/polyester copolymer urethane using diphenylmethane diisocyanate as a raw material (solids content: 30% by mass), the following evaluations were conducted.

Comparative Example 2

Using an N,N-dimethylformamide solution of hydrophilic polyether/polycarbonate copolymer urethane using 4,4'-dicyclohexylmethane diisocyanate as a raw material (solids content: 25% by mass), the following evaluations were conducted.

[Preparation of a film for evaluation] 30 Parts by mass of N,N-dimethylformamide was added to 100 parts by mass of the semi-IPN composite obtained in the Example or 100 parts by mass of the polyurethane used in the Comparative Example, and the resultant diluted semi-IPN composite or polyurethane was applied onto release paper so that the film after being dried had a thickness of 15 μm. The resultant film was dried using a dryer at 70° C. for 2 minutes and then at 120° C. for 2 minutes to obtain a film for evaluation.

[Evaluation Method for Resistance to Swelling by Water]

All the films for evaluation were individually cut into a size of 2 cm (length)×5 cm (width) to obtain test specimens. The obtained test specimen was immersed in ion-exchanged water at 25° C. for one hour, and taken out of the water and a length of the film in the width direction was measured, and a swell (%) was calculated using the following formula (1).

Swell (%)=(the length (cm) of the moisture-permeable film or the film after immersion−5 (cm))/5 (cm)×100    (1)

[Evaluation Method for Moisture Permeability]

With respect to the films for evaluation prepared from the semi-IPN composites obtained in Examples 1 to 8 and the film for evaluation prepared from the polyurethane (A) in Comparative Example 1, the water vapor transmission rate (g/m²/24 h) was measured in accordance with JIS L1099: 2012, B-1 method (potassium acetate method).

[Evaluation Method for Contact Angle to Water]

With respect to the films for evaluation prepared from the semi-IPN composites obtained in Examples 9 to 18 and the film for evaluation prepared from the polyurethane (A) in Comparative Example 2, a contact angle to water was measured using "DropMaster 700" having a temperature measuring unit (DM) (solid-liquid interface analysis system option), manufactured by Kyowa Interface Science Co., Ltd.

[Evaluation Method for Stain Resistance]

With respect to the films for evaluation prepared from the semi-IPN composites obtained in Examples 9 to 18 and the film for evaluation prepared from the polyurethane (A) in the Comparative Example, each film was put on the frictional surface of an abrasion tester, and a black stained test cloth ("EMPA104", manufactured by Swissatest Testmaterialien AG) was put on the abrading block, and a 100-time reciprocating test was conducted under a load of 1 kg. Then, the resultant test specimen was wiped using BEMCOT wetted with pure water to check whether a black stain was on the specimen, and evaluation was made according to the following criteria.

"◯": Black stain is completely wiped off.
"Δ": Part of black stain remains.
"x": No black stain can be wiped off.

TABLE 1

|  |  | Example 1 | Example 2 | Example 3 | Example 4 | Example 5 |
|---|---|---|---|---|---|---|
| Polymerization product (B) | Polyurethane (A) Type | MDI/PEs Pu (B-1) | MDI/PEs Pu (B-2) | MDI/PEs Pu (B-3) | MDI/PEs Pu (B-4) | MDI/PEs Pu (B-5) |
|  | Hydrophilic acrylic monomer (b1) |  |  |  |  |  |
|  | Acrylic monomer (b1-1) having an amide group | DMAA | DMAA | DMAA | DMAA | DMAA |
|  | Acrylic monomer (b1-2) having an oxyethylene group | AM-90G | AM-90G | AM-90G | AM-90G | AM-90G |
|  | Acrylic monomer (b2) having a hydrolyzable silyl group | KBE-502 | KBE-502 | KBE-503 | KBE-503 | KBM-503 |
|  | Molar ratio ((b1-1)/(b1-2)/(b2)) | 71/24/5 | 68/22/10 | 71/24/5 | 68/22/10 | 71/24/5 |
|  | Amount of polymerization product (B) mixed, relative to 100 parts by mass of polyurethane (A) (Parts by mass) | 30 | 30 | 30 | 30 | 30 |
| Resistance to swelling by water: Swell (%) |  | 0 | 0 | 0 | 0 | 0 |
| Evaluation of moisture permeability |  |  |  |  |  |  |
| Water vapor transmission rate (g/m²/24 h) |  | 22,230 | 20,300 | 23,400 | 21,000 | 22,200 |

TABLE 2

|  |  | Example 6 | Example 7 | Example 8 | Comparative Example 1 |
|---|---|---|---|---|---|
| Polymerization product (B) | Polyurethane (A) Type | MDI/PEs Pu (B-6) | MDI/PEs Pu (B-7) | MDI/PEs Pu (B-8) | MDI/PEf•Pes Pu |
|  | Hydrophilic acrylic monomer (b1) |  |  |  |  |
|  | Acrylic monomer (b1-1) having an amide group | DMAA | DMAA | DMAA | — |
|  | Acrylic monomer (b1-2) having an oxyethylene group | AM-90G | AM-130G | AM-130G | — |
|  | Acrylic monomer (b2) having a hydrolyzable silyl group | KBM-503 | KBE-502 | KBE-502 | — |
|  | Molar ratio ((b1-1)/(b1-2)/(b2)) | 68/22/10 | 71/24/5 | 68/22/10 | — |
|  | Amount of polymerization product (B) mixed, relative to 100 parts by mass of polyurethane (A) (Parts by mass) | 30 | 30 | 30 | — |
| Resistance to swelling by water: Swell (%) |  | 0 | 2 | 1 | 7 |
| Evaluation of moisture permeability |  |  |  |  |  |
| Water vapor transmission rate (g/m$^2$/24 h) |  | 20,070 | 32,220 | 30,800 | 24,000 |

TABLE 3

|  |  | Example 9 | Example 10 | Example 11 | Example 12 | Example 13 |
|---|---|---|---|---|---|---|
| Polymerization product (B) | Polyurethane (A) Type | H$_{12}$MDI/PC Pu (B-1) | H$_{12}$MDI/PC Pu (B-2) | H$_{12}$MDI/PC Pu (B-3) | H$_{12}$MDI/PC Pu (B-4) | H$_{12}$MDI/PC Pu (B-5) |
|  | Hydrophilic acrylic monomer (b1) |  |  |  |  |  |
|  | Acrylic monomer (b1-1) having an amide group | DMAA | DMAA | DMAA | DMAA | DMAA |
|  | Acrylic monomer (b1-2) having an oxyethylene group | AM-90G | AM-90G | AM-90G | AM-90G | AM-90G |
|  | Acrylic monomer (b2) having a hydrolyzable silyl group | KBE-502 | KBE-502 | KBE-503 | KBE-503 | KBM-503 |
|  | Molar ratio ((b1-1)/(b1-2)/(b2)) | 71/24/5 | 68/22/10 | 71/24/5 | 68/22/10 | 71/24/5 |
|  | Amount of polymerization product (B) mixed, relative to 100 parts by mass of polyurethane (A) (Parts by mass) | 30 | 30 | 30 | 30 | 30 |
| Resistance to swelling by water: Swell (%) |  | 0 | 0 | 0 | 0 | 0 |
| Contact angle to water (°) |  | 14 | 16 | 15 | 19 | 15 |
| Evaluation of stain resistance |  | ○ | ○ | ○ | ○ | ○ |

TABLE 4

|  |  | Example 14 | Example 15 | Example 16 | Comparative Example 2 |
|---|---|---|---|---|---|
| Polymerization product (B) | Polyurethane (A) Type | H$_{12}$MDI/PC Pu (B-6) | H$_{12}$MDI/PC Pu (B-7) | H$_{12}$MDI/PC Pu (B-8) | H$_{12}$MDI/PC•PEt Pu |
|  | Hydrophilic acrylic monomer (b1) |  |  |  |  |
|  | Acrylic monomer (b1-1) having an amide group | DMAA | DMAA | DMAA | — |
|  | Acrylic monomer (b1-2) having an oxyethylene group | AM-90G | AM-130G | AM-130G | — |
|  | Acrylic monomer (b2) having a hydrolyzable silyl group | KBM-503 | KBE-502 | KBE-502 | — |
|  | Molar ratio ((b1-1)/(b1-2)/(b2)) | 68/22/10 | 71/24/5 | 68/22/10 | — |
|  | Amount of polymerization product (B) mixed, relative to 100 parts by mass of polyurethane (A) | 30 | 30 | 30 | — |

TABLE 4-continued

|  | Example 14 | Example 15 | Example 16 | Comparative Example 2 |
|---|---|---|---|---|
| (Parts by mass) | | | | |
| Resistance to swelling by water: Swell (%) | 0 | 2 | 1 | 6 |
| Contact angle to water (°) | 19 | 15 | 20 | 38 |
| Evaluation of stain resistance | ○ | ○ | ○ | Δ |

The abbreviations shown in Tables 1 to 4 have the following meanings.

"MDI/PEs Pu": N,N-Dimethylformamide solution of polyester urethane using diphenylmethane diisocyanate as a raw material (solids content: 20% by mass)

"MDI/PEs•PEt Pu": N,N-Dimethylformamide solution of hydrophilic polyether/polyester copolymer urethane using diphenylmethane diisocyanate as a raw material (solids content: 30% by mass)

"$H_{12}$MDI/PC Pu": N,N-Dimethylformamide solution of polycarbonate urethane using 4,4'-dicyclohexylmethane diisocyanate as a raw material (solids content: 25% by mass)

"$H_{12}$MDI/PC•PEt Pu": N,N-Dimethylformamide solution of hydrophilic polyether/polycarbonate copolymer urethane using 4,4'-dicyclohexylmethane diisocyanate as a raw material (solids content: 25% by mass)

"DMAA": N,N-Dimethylacrylamide

"KBE-502": 3-Methacryloxypropylmethyldiethoxysilane

"KBE-503": 3-Methacryloxypropyltriethoxysilane

"KBM-503": 3-Methacryloxypropyltrimethoxysilane

It has been found that a film having excellent resistance to swelling by water can be obtained from the semi-IPN composite obtained by the method of the invention. Further, it has been found that, in Examples 1 to 5 using the aromatic polyisocyanate (a2-1) as the polyurethane (A), further excellent moisture permeability can be obtained. Furthermore, it has been found that, in Examples 6 to 10 using the aliphatic or alicyclic polyisocyanate (a2-2) as the polyurethane (A), further excellent hydrophilicity and stain resistance can be obtained.

On the other hand, in Comparative Example 1 that is an embodiment in which an aromatic polyurethane was solely used, the resistance to swelling by water was poor.

In Comparative Example 2 that is an embodiment in which an aliphatic polyurethane was solely used, the resistance to swelling by water was poor.

The invention claimed is:

1. A method for producing a semi-IPN composite, comprising: mixing a polyurethane (A) and a polymerization product (B) of a hydrophilic acrylic monomer (b1) and an acrylic monomer (b2) having a hydrolyzable silyl group; and causing the polymerization product (B) to undergo cross-linking.

2. The method for producing a semi-IPN composite according to claim 1, wherein the hydrophilic acrylic monomer (b1) includes an acrylic monomer (b1-1) having an amide group and an acrylic monomer (b1-2) having an oxyethylene group.

3. The method for producing a semi-IPN composite according to claim 2, wherein the polymerization ratio, molar ratio, of the acrylic monomer (b1-1) having an amide group, the acrylic monomer (b1-2) having an oxyethylene group, and the acrylic monomer (b2) having a hydrolyzable silyl group {(b1-1)/(b1-2)/(b2)} is in the range of 50/49.5/0.5 to 89/1/10.

4. The method for producing a semi-IPN composite according to claim 1, wherein the amount of the polymerization product (B) mixed is in the range of 10 to 70 parts by mass, relative to 100 parts by mass of the polyurethane (A).

* * * * *